(12) United States Patent
Higuchi

(10) Patent No.: US 7,170,657 B2
(45) Date of Patent: Jan. 30, 2007

(54) IMAGE READING APPARATUS AND IMAGE INPUT-OUTPUT APPARATUS

(75) Inventor: Kenji Higuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 854 days.

(21) Appl. No.: 10/236,833

(22) Filed: Sep. 6, 2002

(65) Prior Publication Data

US 2003/0128406 A1    Jul. 10, 2003

(30) Foreign Application Priority Data

Sep. 7, 2001   (JP)   ............... 2001-271470

(51) Int. Cl.
  *H04N 1/04*   (2006.01)
  *H04N 1/46*   (2006.01)
  *H01L 27/00*  (2006.01)

(52) U.S. Cl. .............. 358/488; 358/486; 358/497; 250/208.1

(58) Field of Classification Search ........... 358/488, 358/486, 497; 250/208.1
  See application file for complete search history.

(56) References Cited

U.S. PATENT DOCUMENTS 6,229,629 B1 *  5/2001  Tsai ..................... 358/486
6,392,762 B1 *  5/2002  Tsai et al. .............. 358/488

FOREIGN PATENT DOCUMENTS

JP    11-038521    *  2/1999

* cited by examiner

*Primary Examiner*—Jerome Grant
*Assistant Examiner*—Houshang Safaipour
(74) *Attorney, Agent, or Firm*—John J. Penny, Jr.; Edwards Angell Palmer & Dodge LLP

(57) ABSTRACT

A concave portion (50) constructed by a circular hole is formed at a guide member (16) positioning a original on aboard surface (15) of an original table (14) by joining a surrounding edge portion of the original table (14) and attaching to the original. Concave portion image data displaying shadow of the concave portion (50) by reading shadow of the concave portion (50) at a scanning portion is produced, and an origin of original image data corresponding to a reading origin (47) on the board surface (15) by a control portion is set to the scanning portion based on the concave portion image data.

12 Claims, 7 Drawing Sheets

IMAGE READING APPARATUS AND IMAGE INPUT-OUTPUT APPARATUS

BACKGROUND OF THE INVENTION

The present invention relates to an image reading apparatus and an image input-output apparatus.

Generally, a flat-bed type image reading apparatus is known, which is provided with a transparent, plate-shaped original table, for putting an object thereon, on an upper surface of a body of the apparatus as a apparatus reading an optical image of the object.

Generally, the flatbed type image reading apparatus is provided with a guide member, for positioning an object on a board surface of the original table by attaching the object thereto, which is jointed to surrounding edge portions of the original table. In the image reading apparatus, inside of a rectangle area whose vertex is defined as a reading origin setting a position by employing edge sides of the guide member as a standard is set as a reading area, and image data representing an optical image in the area is outputted.

Incidentally, in the above-mentioned image reading apparatus, it is difficult to completely remove stagger of main scanning line by completely removing looseness of a carriage installing an image sensor etc. and a guide thereof. In light of such the circumstances and producing allowance, in order to prevent that a picture of the guide member itself passing the reading area set on the board surface of the original table is outputted as an image data, the reading origin of the object is set to a position slightly separated from edge sides of the guide member on the board surface of the original table.

However, since the reading area is set to inner side of the original table than the edge sides of the guide member by separating the reading origin from the edge sides of the guide member, the surrounding edge portions of the object can not be read even by attaching the object such as paper document and the like to the edge sides of the guide member closely. Therefore, it is desirable to set the reading origin as close as the edge sides of the guide member. The reading origin in the general image reading apparatus is set to the position separating about 3 mm respectively from edge sides of two guide members crossing each other at a right angle.

SUMMARY OF THE INVENTION

The invention is performed in view of the above-mentioned problems, and an object of the invention is to provide an image reading apparatus and an image input-output apparatus narrowing an area not reading of surrounding edges of an original table.

DETAILED DESCRIPTION OF THE PREFERRED EMBODIMENT

Figure 2:
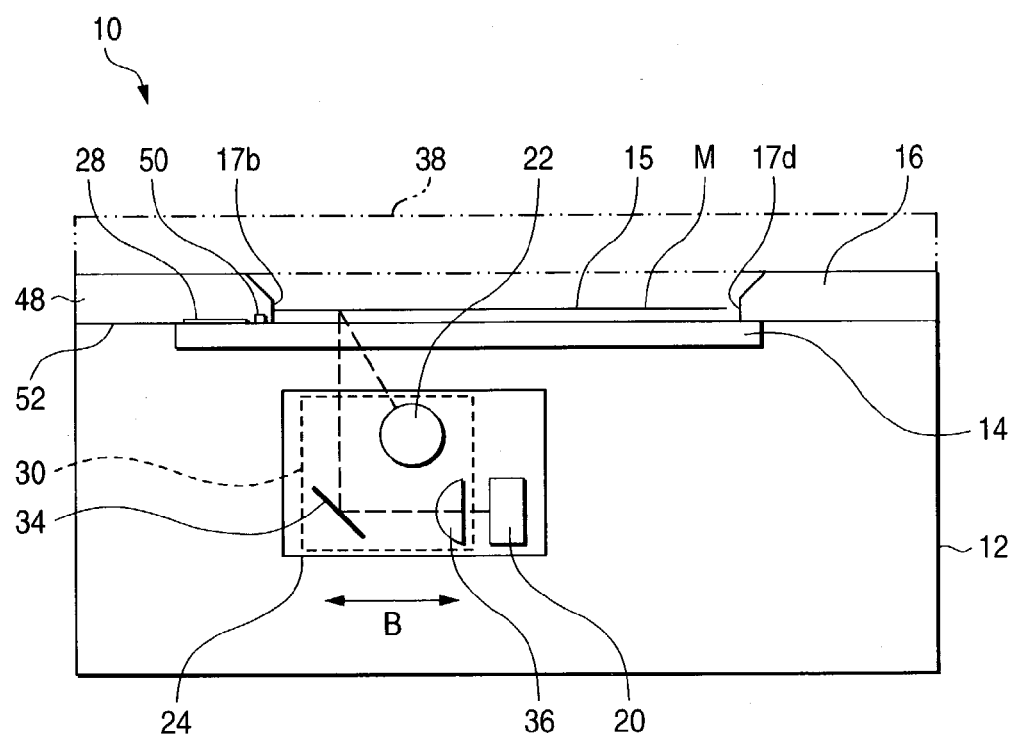
FIG. 2 is a sectional view showing roughly an image scanner according to an embodiment of the invention.

An embodiment showing a mode for carrying out the invention will be described based on figures. FIG. 2 shows an image scanner 10 as an image reading apparatus according to an embodiment of the invention.

Figure 3:
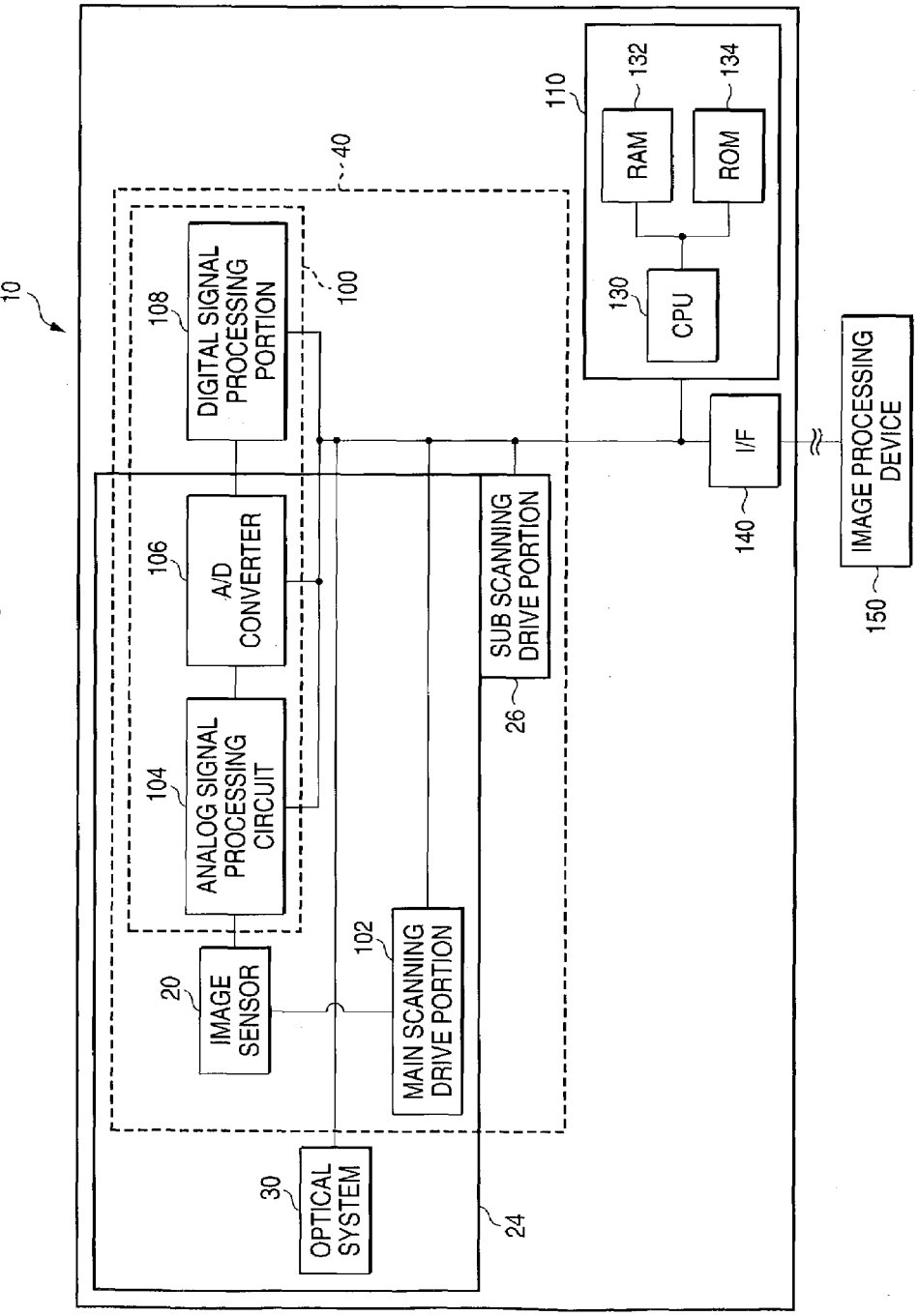
FIG. 3 is a block diagram showing an image scanner according to an embodiment of the invention.

The image scanner 10 is a so-called flatbed type image scanner provided with an original table 14 on an upper surface of a substantially box-shaped body 12. As shown in FIG. 3, the image scanner 10 is provided with: a scanning portion 40 which includes an image sensor 20, a main scanning drive portion 102, a sub scanning drive portion 26 and a process portion 100, and outputs image data representing optical image by photoelectric converter while moving main scanning lines to sub scanning lines direction; an optical system 30 for inputting an optical image on a main scanning line to the image sensor 20 of the scanning portion 40; and a control portion 110 for setting an origin of image data at the scanning portion 40.

Figure 1A:
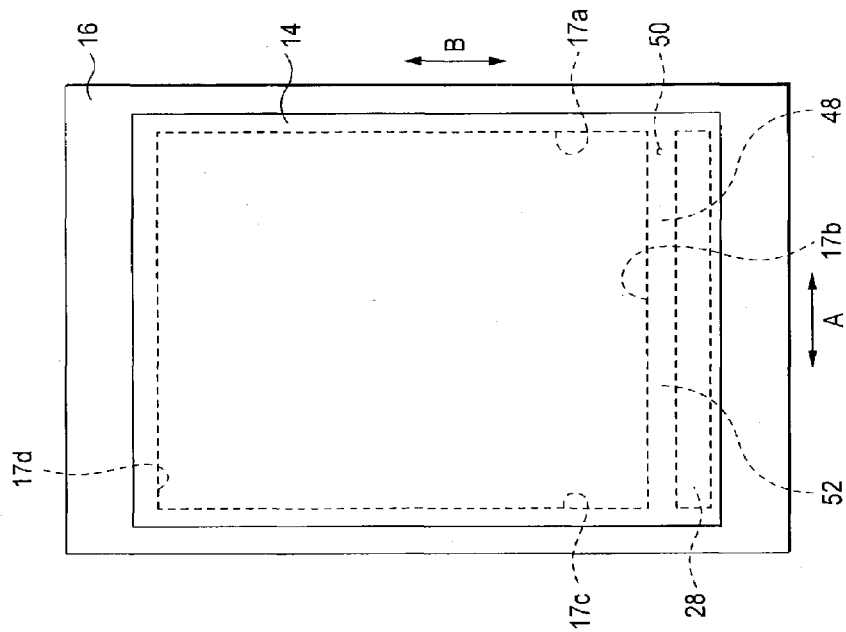
FIG. 1A and FIG. 1B are a plane view and a bottom view showing roughly an original table and a guide member of an image scanner according to an embodiment of the invention.
Figure 1B:
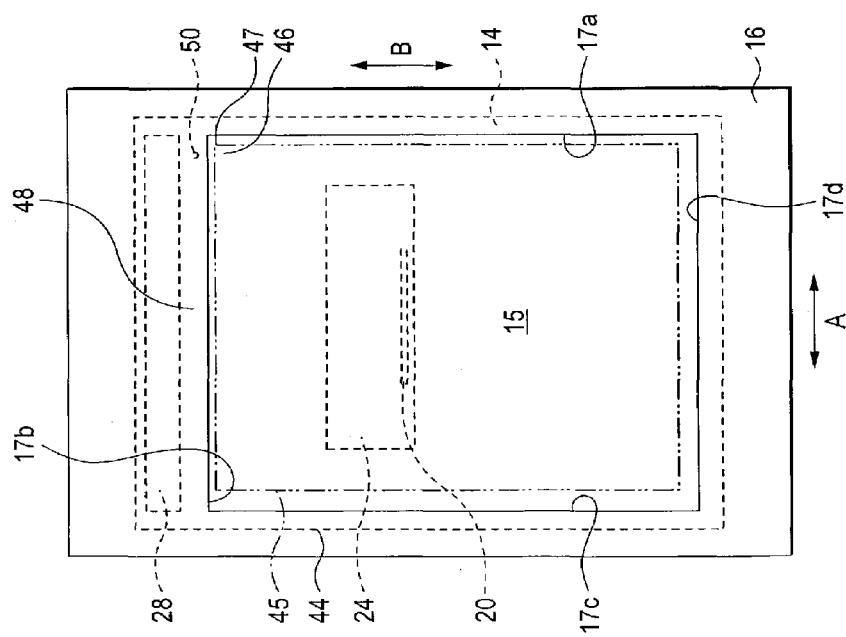

The original table 14 shown in FIG. 1A, FIG. 1B, and FIG. 2 is formed by a transparent plate such as substantially rectangle glass plate and the like, and an original M such as a printed document, a picture, and the like is put on a board surface 15 thereof. At a surrounding edge portion of the original table 14, a substantially rectangle-shaped original guide 16 attaching the original M and positioning the original on the board surface 15 of the original table 14 is joined. The original guide 16 is one example of "the guide member" described in claims. Here, the original table 14 and the original guide 16 are joined by a screw, a duplicated tape, adhesive, and so on for example. Among of four inner edge sides of the original guide 16, inner edge sides 17a and 17c facing each other in a main scanning direction (direction shown with A in FIGS. 1A and 1B) extend in parallel to the axis of a sub scanning direction (direction shown with B in FIG. 1A, FIG. 1B, and FIG. 2) perpendicular to the main scanning direction axis, and inner edge sides 17b and 17d facing each other in the sub scanning direction extend in parallel to the main scanning direction axis. In an area 44 on the board surface 15 surrounded with these inner edge sides 17a to 17d, a original reading area 45 is set as shown with a two-dots chain line in FIG. 1A. The original reading area 45 has a rectangular configuration one size smaller than the area 44. The area 44 of the embodiment has a reading origin 47 set as a vertex separated 1.6 mm from the inner edge side 17a forming a corner portion (upper right corner portion in FIG. 1A) of the area 44 and separated 1 mm from the inner edge side 17b. Here, the position of the reading origin 47 on the board surface 15 is a position corresponding to the origin of image data set at the control portion 110.

Figure 4A:
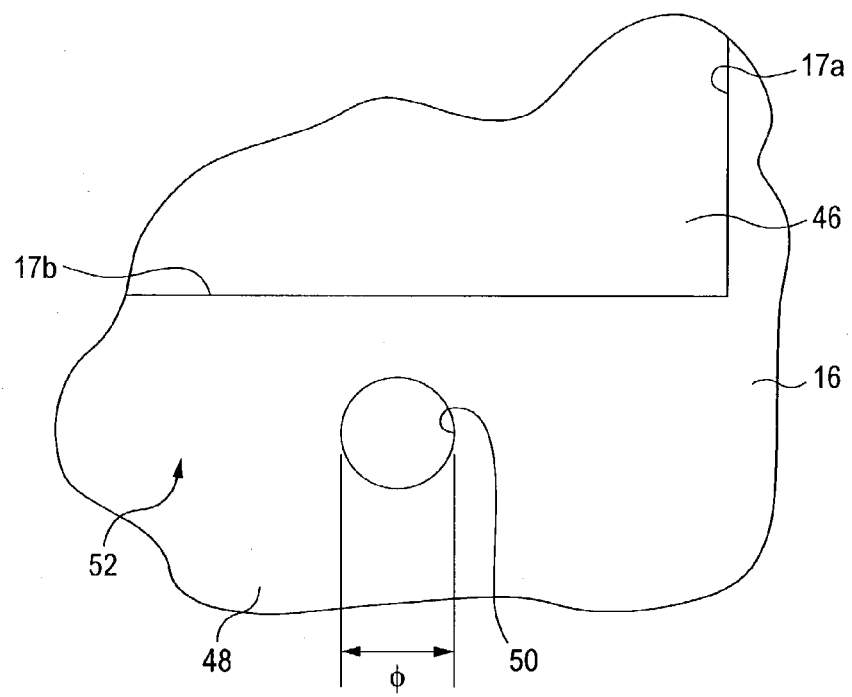
FIG. 4A and FIG. 4B are a plane view and a bottom view showing a concave portion formed at the guide members shown in FIG. 1A and FIG. 1B.
Figure 4B:
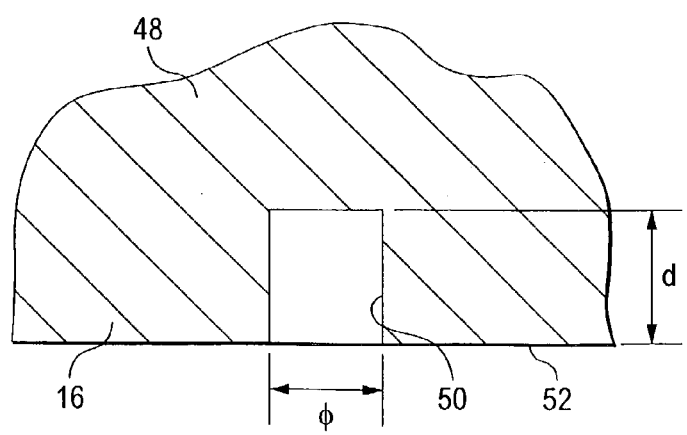

A concave portion 50 is provided at a part 48 forming the inner edge side 17b at the original guide 16 as shown in FIG. 1A, FIG. 1B, FIG. 2, FIG. 4A and FIG. 4B. The concave portion 50 is formed at a surface 52 (a concave portion forming surface, hereafter) joined to the original table 14 of the part 48, and optical image of the concave portion 50 is possible to be input to the image sensor 20 by the optical system 30. In the embodiment, the concave portion 50 is provided at vicinity of the above-mentioned corner portion 46 setting the reading origin 47. A shape of the concave portion 50 may be a shape in which clear shadow in contrast, some degree, is read by the scanning portion 40 at radiation by a reflective original light source 22. Dimension of inner size of the concave portion 50 may be set suitably corresponding to the size of the concave portion 50. The concave portion 50 is constructed by a circular hole having 0.8 mm diameter φ substantially and 1 mm depth d substantially in the embodiment as shown in FIG. 4A and FIG. 4B. When the origin of image data is set at the control portion 110 and the scanning portion 40, accuracy of setting can be increased while making easy to form the concave portion 50 by adopting such the concave portion 50. Although it is desirable to mold the concave portion 50 at the same time of forming the original guide 16 by die on making producing allowance small, it may be formed by drilling process after molding.

A white standard plate 28 extending to the main scanning direction is applied at a position not covering the concave portion 50 in the concave forming surface 52 of the original guide 16. The white standard plate 28 has a uniform reflective surface of high reflectance.

The sub scanning drive portion 26 of the scanning portion 40 shown in FIG. 3 is provided with a carriage 24, a belt put on the carriage 24, a step motor for rotating the belt and being easy in control for example, and so on. The carriage 24 is put freely to slide on a guide shaft parallel to the board surface 15 of the original table 14 and is provided freely to move reciprocatingly to parallel in sub scanning direction B to the inner edge side 17a of the guide portion 16 as shown in FIG. 2. The carriage 24 carries the image sensor 20 and the optical system 30 parallel to the board surface 15 of the original table 14 by belt drive for example.

The optical system 30 is constructed by the reflective original light source 22, a mirror 34, a light collecting lens 36, and the like. Here, the reflective original light source 22 is constructed by a tube illumination such as fluorescent tube lamp and the like, and is installed at the carriage 24 at the figure extending to main scanning direction. A reflective light picture on the main scanning line irradiated by the reflective original light source 22 is image-formed on the image sensor 20 by the mirror 34 and the light collecting lens 36 as shown with a broken line in FIG. 2. Function that the optical system 30 forms the optical image on the main scanning line on the image sensor 20 corresponds to function of "optical system" described in claims.

A transparent original light source 38 may be provided at the position in the image scanner 10 shown with two points chain line in FIG. 2, in this case, an optical system image-forming a transparent light picture of a transparent original on the image sensor 20 can be constructed.

The image sensor 20 of the scanning portion 40 scans the optical image inputted by the optical system 30 by photo-electric converter, and outputs correlative electric signal in shade of the optical image. A linear sensor is used as the image sensor 20. In the embodiment, the linear sensor 20 is installed at the carriage 24 in the position in which plural photoelectric devices such as photo diode and the like line in straight to the main scanning direction parallel to the inner edge side 17b of the guide portion 16 as shown with a broken line in FIG. 1A. For the linear sensor 20, a linear image sensor of lens reduction type is used, which stores charge for a predetermined time obtained by photoelectric converting light of the predetermined wavelength area such as visible light, infrared light, ultra violet light, and the like, and outputs electric signal corresponding to quantity receiving light by using a CCD (Charge Coupled Device), a MOS transistor switch, and the like. A contact type two dimension sensor maybe used instead of the linear sensor 20.

The scanning portion 40 may output monochrome or color. In the case of color output, a linear sensor 20 of 3 lines or 6 lines forming color filter array at the light-receiving portion with on-chip may be used. For the color filter array, a matter constructed by primary color filter of R (Red), G (Green), and B (Blue) may be used, or a matter constructed by complementary color filter of four colors of C (Cyan), M (Magenta), Y (Yellow), and G (Green) or three colors of CMY may be used.

The main scanning drive portion 102 is an electronic circuit for generating a driving pulse necessary for driving the linear sensor 20 such as a shift pulse, a transmitting pulse and the like and outputting it to the linear sensor 20. The main scanning drive portion 102 is constructed by a synchronization signal generator, a timing generator for driving, and the like for example.

The process portion 100 is constructed by an analog signal processing circuit 104, an A/D converter 106, a digital signal process portion 108, and the like, and processes electric signal outputted from the linear sensor 20 and outputs image data displaying optical image inputted to the linear sensor 20 by the optical system 30.

The analog signal processing circuit 104 performs analog signal process such as amplifying, noise reduction process, and the like to analog signal outputted from the linear sensor 20, and outputs the processed signal to the A/D converter 106.

The A/D converter 106 quantizes analog electric signal outputted from the analog signal processing circuit 104 to digital image signal having the predetermined gradation, and output the image signal to the digital signal process portion 108.

The digital signal process portion 108 performs various kinds of digital signal process such as shading correction by using the white standard plate 28, gamma correction, picture element interpolation, and the like to image signal outputted from the A/D converter 106 so as to produce image data. Various kinds of processes performed by the digital signal process portion 108 may be replaced to a process by computer program performed by an image processing device 150 connected to the control portion 110 or the image scanner 10.

The control portion 110 is constructed by a microcomputer providing a CPU 130, a RAM 132, and a ROM 134, and is connected to the scanning portion 40, the reflective original light source, and the like through bus. The control portion 110 sets an origin of original image data $D_m$ based on concave portion image data D The control portion $110_h$ described later by performing computer program memorized in the ROM 134.

The control portion 110 performs whole controls of the image scanner 10 such as operational control of the linear sensor 20 (that is, operational control of the main scanning drive portion 102), moving control of the carriage 24 (that is, operational control of sub scanning drive portion 26), control of blinking and quantity of light of the reflective original light source 22, operational control of each element of the process portion 100, and the like by carrying out computer program in addition to setting the above-mentioned origin.

The image scanner 10 is provided with an interface (I/F) 140 connected to the control portion 110 with bus in addition to each element described above. An image processing device 150 such as a personal computer and the like can be connected to the I/F 140, and the control portion 110 transmits original image data outputted from the scanning portion 40 (process portion 100) at reading original, to the image processing device 150 through the I/F 140.

A method for setting an origin of original image data $D_m$ in the embodiment will be described below in detail.

Figure 6:
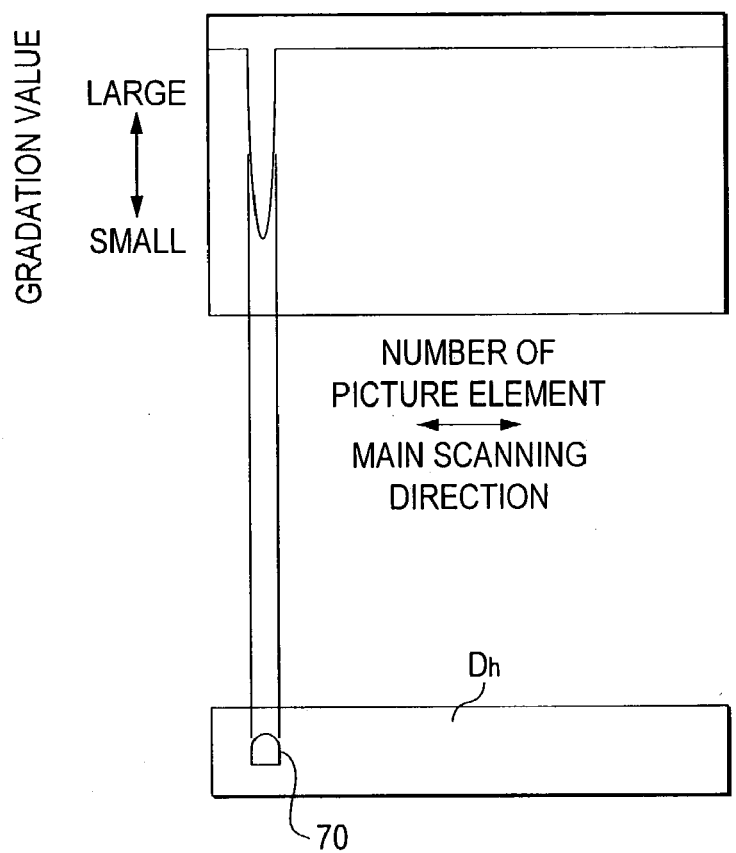
FIG. 6A and FIG. 6B are illustrated views explaining image data of the concave portion produced according to an embodiment of the invention.

First, concave portion image data $D_h$ outputted from the digital signal process portion 108 by reading the surrounding area of the concave portion 50 to set the origin of the original image data $D_m$ at the control portion 110 and the scanning portion 40 will be described. The concave portion image data $D_h$ is produced by scanning the surrounding area of the concave portion 50 by the linear sensor 20 while moving main scanning line to sub scanning direction by sub scanning drive portion 26 at turning the power source of the image scanner on for example. The concave portion image data $D_h$ displays gradation information of optical image in the surrounding area of the concave portion 50 at every picture element as shown in FIG. 6A. In FIG. 6A, an example of graduation value of each element corresponding to one main scanning line on which the concave portion puts is shown. Image element range 70 of low gradation value (shadow picture element range, hereafter) displaying shadow appearing in the concave portion appears in the concave portion image data $D_h$ as shown in FIG. 6A and FIG. 6B. In FIG. 6B, an external form line of the image element range 70 is shown with a solid line for convenience. Since the reflective original light source 22 irradiates the concave portion 50 from oblique direction to hole axis thereof, shape of the image element range 70 is not a circle given by an opening portion of the concave portion as shown in FIG. 6B.

Based on the concave portion image data $D_h$, the control portion sets an origin of the original image data $D_m$ to the scanning portion 40 as the followings.

Figure 7A:
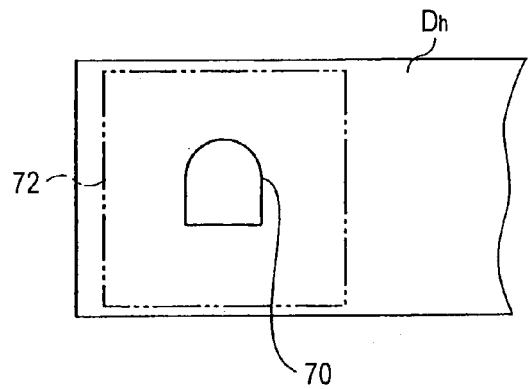
FIG. 7A to FIG. 7C are illustrated views explaining a method for setting an origin of original image data based on image data of the concave portion according to an embodiment of the invention.

(i) First, in order to extract contour of the shadow image element range 70 about the concave portion image data $D_h$, as shown in FIG. 7A, gradation values of whole image element in the range 72 previously set so as to surround the shadow image element range 70 widely are averaged, and binary value process is performed to the concave portion image data $D_h$ by employing the mean value as threshold value.

Figure 7B:
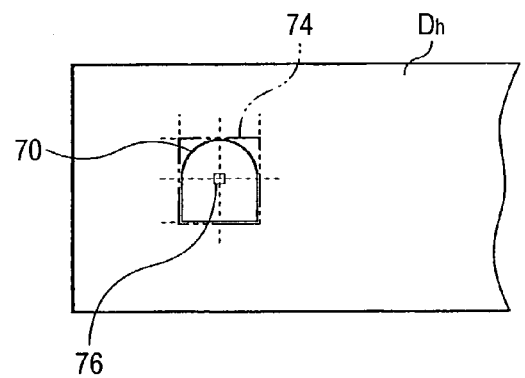

(ii) Next, a rectangle range 74 where the shadow image element range 70 inscribes is set about the concave portion image data $D_h$ performing binary value process, and sets the position of the picture element 76 positioning at center of the rectangle range 74 as a standard position on the image data as shown in FIG. 7B.

Figure 7C:
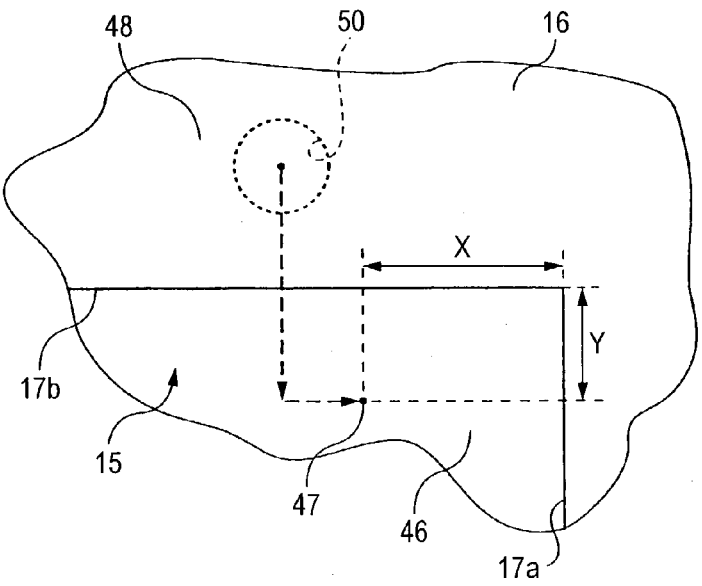

(iii) Continuously, a position offset from the standard position in the main scanning direction and the sub scanning direction by a distance represented in own coordinate system of the scanning portion corresponding to physical distance between the concave portion 50 and the reading origin 47 is set as the origin of the original image data $D_m$ as shown in FIG. 7C.

Although the method for setting the origin of the original image data $D_m$ based on the center position of the rectangle range 74 where the shadow image element range 70 inscribes is described above, the origin may be set based on position of center of gravity specifying the position of gravity center of the shadow image element range 70 except this.

Figure 5A:
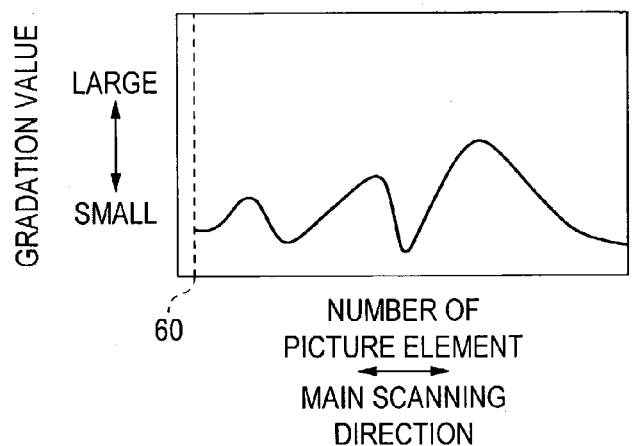
FIG. 5A to FIG. 5C are illustrated views explaining image data of the concave portion produced according to an embodiment of the invention.
Figure 5B:
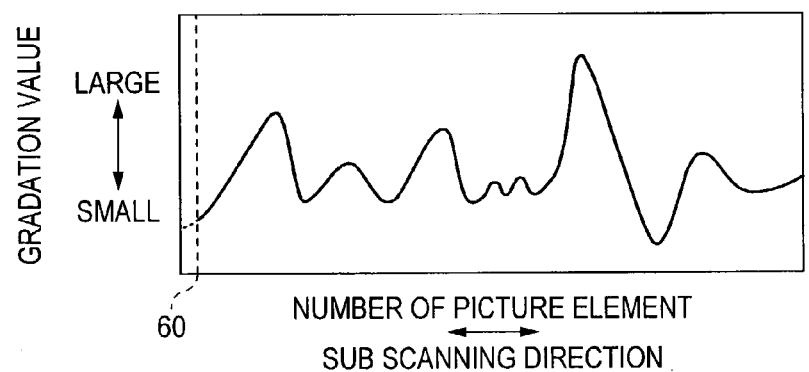
Figure 5C:
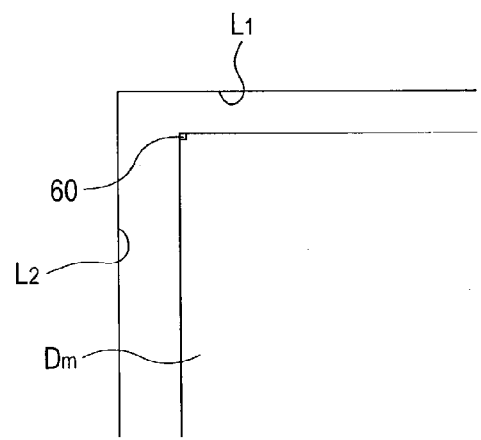

Next, the original image data $D_m$ outputted from the digital signal process portion 108 at reading original will be described. The original image data $D_m$ is produced by scanning the original M with the linear sensor 20 while moving main scanning line to sub scanning direction by the sub scanning drive portion 26. The original image data $D_m$ displays gradation information of optical image of the original in the reading area 45 among the optical image inputted to the linear sensor 20 with gradation value of each picture element. In FIG. 5A, gradation value about each picture element ranging to main scanning direction from the origin 60 corresponding to the reading origin 47 is shown with a solid line, and gradation value about picture element inputted to the linear sensor 20 but not included in original image data $D_m$ is shown with a broken line. In FIG. 5B, gradation value about each picture element ranging to sub scanning direction from the origin 60 is shown with a solid line, and gradation value about picture element inputted to the linear sensor 20 but not included in original image data $D_m$ is shown with a broken line. For the coordinate systems of the scanning portion 40 which is employed directly or indirectly to define an image in the scanning portion 40, a position relation between imaginary lines $L_1$ and $L_2$ respectively corresponding to the inner edge sides 17b and 17a of the original guide 16, and the origin 60 is shown in FIG. 5C.

Since the concave portion 50 is formed directly at the original guide 16 in the embodiment, allowance about relative position relation between the concave portion 50 and the reading origin 47 includes allowance range of the original guide 16 itself. Therefore, according to the embodiment as shown in FIG. 7C, it can be set the origin 60 so that distance Y of sub scanning direction between the position of the reading origin 47 corresponding to the origin 60 and the inner edge side 17b is less than 1 mm and distance X of main scanning direction between the position of the reading origin 47 and the inner edge side 17a is less than 1.6 mm. That is, according to the image scanner 10 of the embodiment, area of the board edges of the original table 14 where the reading cannot be performed can be made narrow.

Although an embodiment of the invention is described above, this is only an example, and the invention is not limitedly interpreted by the description of the embodiment.

Although the example that the invention is applied for the image scanner as an image reading apparatus is described in the above-mentioned embodiment for example, the invention is applicable for an image input-output apparatus such as a complex machine providing an image reading apparatus and a printing apparatus for forming image representing an object based on image data produced at the image reading apparatus.

What is claimed is:

1. An image reading apparatus comprising: a transparent plate shaped original table for putting an object thereon; a guide member joined to a surrounding edge portion of the original table, to which the object is attached for positioning the object on a board surface of the original table; a scanning portion for outputting image data representing an optical image by photoelectric conversion while moving a main scanning line to a sub scanning direction perpendicular to the main scanning line; an optical system for inputting an optical image on the main scanning line to the scanning portion; a concave portion formed on the guide member at a position where the optical image thereof can be input to the scanning portion by the optical system; and a control portion for setting an origin of the image data to the scanning portion based on the image data representing the optical image of the concave portion.

2. The image reading apparatus according to claim 1, wherein the control portion sets the origin to the scanning portion based on the image data representing shadow appearing in the concave portion.

3. The image reading apparatus according to claim 2, wherein the control portion sets the origin to the scanning portion based on a rectangular center position where the shadow inscribes.

4. The image reading apparatus according to claim 1, wherein the concave portion is an circular hole having 0.8 mm diameter substantially and 1 mm depth substantially.

5. The image reading apparatus according to claim 1, wherein the control portion sets the origin so that distance in the sub scanning direction between a reading origin corresponding to the origin on the board surface of the original table and an edge side of the guide member is less than 1 mm.

6. The image reading apparatus according to claim 1, wherein the control portion sets the origin so that distance in a direction parallel to the main scanning line between a reading origin corresponding to the origin on the board surface of the original table and an edge side of the guide member is less than 1.6 mm.

7. The image input-output apparatus comprising: an image reading apparatus according to claim 1, and a printing apparatus for forming an image representing the object on a printing medium based on the image data.

8. The image input-output apparatus comprising: an image reading apparatus according to claim 2, and a printing apparatus for forming an image representing the object on a printing medium based on the image data.

9. The image input-output apparatus comprising: an image reading apparatus according to claim 3, and a printing apparatus for forming an image representing the object on a printing medium based on the image data.

10. The image input-output apparatus comprising: an image reading apparatus according to claim 4, and a printing apparatus for forming an image representing the object on a printing medium based on the image data.

11. The image input-output apparatus comprising: an image reading apparatus according to claim 2, and a printing apparatus for forming an image representing the object on a printing medium based on the image data.

12. The image input-output apparatus comprising: an image reading apparatus according to claim 6, and a printing apparatus for forming an image representing the object on a printing medium based on the image data.

* * * * *